Patented June 21, 1938

2,121,368

UNITED STATES PATENT OFFICE 2,121,368

PROCESS OF CATALYTICALLY HYDROGENATING METAL SALTS OF HIGH MOLECULAR NONAROMATIC CARBOXYLIC ACIDS

Georg Schiller, Mannheim, Germany, assignor to I. G. Farbenindustrie Aktiengesellschaft, Frankfort-on-the-Main, Germany No Drawing. Application November 14, 1936, Serial No. 110,848. In Germany July 27, 1934

10 Claims. (Cl. 260—156)

This application is a continuation-in-part of the U. S. application Ser. No. 33,127, filed July 25th, 1935, which relates to a new process of catalytically hydrogenating salts of high-molecular non-aromatic carboxylic acids or materials containing the same, such as neutralized oxidation products of high-molecular non-aromatic hydrocarbons.

I have now found that valuable alcohols are obtained by treating salts of di- or trivalent metals of non-aromatic carboxylic acids containing at least 8 carbon atoms in the molecule or materials containing the same at elevated temperatures under superatmospheric pressure with a gas essentially comprising hydrogen in the presence of a hydrogenation catalyst comprising essentially a metal selected from the group consisting of nickel, cobalt and copper.

Suitable initial materials are salts of such di- or trivalent metals which possess an atomic weight below 150. For example salts of calcium, strontium, barium, magnesium, zinc, cadmium or aluminium and non-aromatic carboxylic acids containing at least 8 carbon atoms in the molecule, such as lauric, palmitic, stearic, oleic, ricinoleic, linoleic acid or montanic, abietic or humic acid or the mixtures of acids obtainable by saponifying vegetable or animal fats and oils, such as coconut oil, palm kernel oil, soy bean oil, train oil. Furthermore the oxidation products from high-molecular non-aromatic hydrocarbons saponified with basic reacting compounds derived from di- and trivalent metals can be employed. Preferably oxidation products are suitable which are obtained by oxidizing hard paraffin wax, soft paraffin wax, higher molecular non-aromatic petroleum hydrocarbons, hydrogenation products of coals, tars, mineral oils and the like, in the liquid phase at elevated temperature, preferably between 100° and 200° C. by means of gases comprising oxygen, such as air, oxygen, nitrous gases or nitric acid or the like, if desired, in the presence of catalysts, such as manganese palmitate, sodium carbonate-manganese stearate, sodium palmitate-aluminium palmitate etc. Instead of the said salts of high-molecular non-aromatic carboxylic acids as such, the salts of raw mixtures containing the acids, for example, the crude reaction mixtures originating from the oxidation of high-molecular non-aromatic hydrocarbons which besides the acids may contain hydrocarbons, ketones, aldehydes and the like, can serve as initial materials. The aforesaid salts from di- to trivalent metals can also be obtained by saponifying higher molecular organic acids or their esters, such as oils, fats, waxes or resins, lactones, or anhydrides with basic reacting substances derived from the said di- or trivalent metals, such as calcium oxide, magnesium oxide and the like or mixtures of these basic reacting substances.

It is also possible to carry out the present process by mixing the carboxylic acids or the starting material containing acids with the aforesaid basic reacting substances and heating the mixture to the temperature as it is required for the hydrogenation, whereby the saponification takes place. Generally the soaps to be hydrogenated are present in the liquid state. Preferably the soaps are employed in form of solutions or suspensions. Suitable solvents are for example particularly the high-molecular aliphatic alcohols, such as dodecyl alcohol or hexadecyl alcohol and so on. Also the hydrogenation product obtained in the present process may be employed as solvent. Furthermore dioxane, high-molecular paraffinic hydrocarbons and high-molecular ethers may be employed as solvents or suspending agents.

A suitable method for preparing catalysts for use in the present process consists in intimately mixing the metals (Ni, Co and/or Cu) with a basic reacting metal oxide or oxides, both components being advantageously in the form of fine powders. Another suitable method of producing the catalysts consists in precipitating together insoluble compounds, for example carbonates, of these two components from solutions containing water-soluble compounds thereof, and drying the precipitates, if desired, after washing. If the hydrogenating component is present in the catalyst in the oxidic form, it is reduced before or at the beginning of the treatment. The said copper, cobalt or nickel catalysts may preferably be activated by the addition of difficultly reducible metal oxides particularly metal oxides of heavy metals, such as manganese oxide, chromium oxide, vanadic acid, tungstic acid and the like.

A further method of preparing the catalysts consists in introducing the basic reacting metal oxides into solutions or melts of nickel, cobalt or copper salts decomposable at elevated temperatures, for example the nitrates, formates and acetates of the said metals. Any other methods of producing activated catalysts may also be employed. Instead of using nickel or cobalt or copper several of these metals may be employed together and instead of using one basic metal oxide several compounds of this type may be applied. Also it may be advantageous to precipitate the catalysts on carriers, for example, on diatomaceous earth, asbestos, bleaching earth, or other substances having a large surface area.

The hydrogenation may be carried out, for example, by passing the materials to be reduced over solidly arranged catalysts in the presence of hydrogen or by dispersing the finely divided catalysts in the starting materials and passing hydrogen through the dispersion. Dispersions of the said kind may be allowed to trickle down through a reaction tower containing filler bodies, such as Raschig rings, hydrogen being led through the tower, preferably in an upward direction.

The catalysts are very readily dispersable in the initial materials which fact is perhaps due to their relatively low specific gravity. The hydrogenation may be carried out at temperatures between 150° to 350° C., preferably between 200° and 300° C. It is advantageous to employ pressures above 10 atmospheres, generally pressures from about 100 to about 300 atmospheres are suitable. By the process as described the carboxylic groups contained in the initial material are completely or partially converted into the —CH$_2$OH—groups. If in the initial material besides the carboxylic groups other reducible groups are present, such as carbonyl groups, the latter are also reduced to alcohol groups.

According to the present process the aforesaid initial materials, particularly the salts of oxidation products of paraffin wax, petroleum and the like can be readily converted into the corresponding alcohols even while employing relatively small amounts of hydrogenating metals, for example from 1 to 2 per cent reckoned on the weight of the initial material. The products obtained may be employed as valuable intermediates for example in the production of assistants for the textile and related industries.

The following examples will further illustrate the nature of this invention, but the invention is not restricted to these examples. The parts and percentages are by weight.

*Example 1*

100 parts of palmitic acid are neutralized with 8 parts of magnesium oxide and the soap formed is hydrogenated for 3 hours in a stirring-autoclave at 270° C., under a hydrogen-pressure of 260 atmospheres in the presence of 6 parts of a copper-zinc oxide-manganese oxide-catalyst precipitated on diatomaceous earth and containing 20 per cent of copper. The product is freed from the catalyst; it has the following characteristics:

Acid number_____ 1
Saponification number_____ 37
Hydroxyl number_____ 197
Carbonyl number_____ 0

If the palmitic acid is not neutralized with magnesium oxide but otherwise treated under the same conditions as indicated above, the product obtained has the following characteristics:

Acid number_____ 42
Saponification number_____ 107
Hydroxyl number__ 216 } In the unsaponifiable matter which amounts to 48.6 per cent
Carbonyl number__ 3 }

*Example 2*

100 parts of an oxidation product from soft paraffin wax having an acid number of 56 and a saponification number of 137 are heated together with 10 parts of zinc oxide for about one hour at 100° C. After adding 4 parts of a catalyst consisting of copper, magnesium oxide and chromium oxide with a content of 30 per cent of metallic copper, the product is treated with hydrogen at 270° C. under a pressure of 200 atmospheres. After separating the catalyst a hydrogenation product is obtained which is practically free from acid and which has the following characteristics:—

Acid number_____ 3
Saponification number_____ 6
Hydroxyl number_____ 157

The product, besides alcohols, as essential constituent only contains unaltered paraffin wax which originates from the initial material.

*Example 3*

Fatty acids obtained by saponification of coconut oil are distilled and then converted into soap by treating with an equivalent amount of calcium oxide and magnesium oxide (1:1) in a pasty form. 50 parts of this soap are dissolved in 50 parts of dodecyl alcohol while heating at 100° C. To this solution 4 parts of the catalyst as mentioned in Example 2 are added. The soaps are then treated with hydrogen at 290° C. under a pressure of 200 atmospheres. A hydrogenation product is obtained which consists practically completely of high molecular aliphatic alcohols having the following characteristics:—

Acid number_____ 3
Saponification number_____ 8
Hydroxyl number_____ 236

What I claim is:—

1. The process of producing alcohols by catalytic hydrogenation of materials containing a substantial amount of a salt of from a di- to a trivalent metal, of a non-aromatic carboxylic acid containing at least 8 carbon atoms in the molecule which consists in treating the said materials at a temperature above 150° C. under a pressure above 10 atmospheres with a gas essentially comprising hydrogen in the presence of a hydrogenation catalyst comprising essentially a metal selected from the group consisting of nickel, cobalt and copper.

2. The process of producing alcohols by catalytic hydrogenation of materials containing a substantial amount of a salt of from a di- to a trivalent metal, of a non-aromatic carboxylic acid containing at least 8 carbon atoms in the molecule which consists in treating the said materials at a temperature between 150° and 350° C. under a pressure above 10 atmospheres with a gas essentially comprising hydrogen in the presence of a hydrogenation catalyst comprising essentially a metal selected from the group consisting of nickel, cobalt and copper.

3. The process of producing alcohols by catalytic hydrogenation of materials containing a substantial amount of a salt of from a di- to a trivalent metal, of a non-aromatic carboxylic acid containing at least 8 carbon atoms in the molecule which consists in treating the said materials at a temperature between 150° and 350° C. and under a pressure of from about 10 to about 300 atmospheres with a gas essentially comprising hydrogen in the presence of a hydrogenation catalyst comprising essentially a metal selected from the group consisting of nickel, cobalt and copper.

4. The process of producing alcohols by catalytic hydrogenation of materials containing a substantial amount of a salt of from a di- to a trivalent metal, of a non-aromatic carboxyli acid containing at least 8 carbon atoms in the molecule which consists in treating the said materials at a temperature between 200° and 300° C. and under a pressure of from about 100 to about 300 atmospheres with a gas essentially comprising hydrogen in the presence of a hydrogenation catalyst comprising essentially a metal selected from the group consisting of nickel, cobalt and copper.

5. The process of producing alcohols by catalytic hydrogenation of materials containing a substantial amount of a salt of from a di- to a trivalent metal, of a non-aromatic carboxylic acid containing at least 8 carbon atoms in the molecule which consists in treating the said materials at a temperature between 200° and 300° C. and under a pressure of from about 100 to about 300 atmospheres with a gas essentially comprising hydrogen in the presence of a hydrogenation catalyst comprising essentially a metal selected from the group consisting of nickel, cobalt and copper activated by adding a difficultly reducible metal oxide.

6. The process of producing alcohols by catalytic hydrogenation of materials containing a substantial amount of a salt of from a di- to a trivalent metal, of a non-aromatic carboxylic acid containing at least 8 carbon atoms in the molecule which consists in treating the said materials at a temperature between 200° and 300° C. and under a pressure of from about 100 to about 200 atmospheres with a gas essentially comprising hydrogen in the presence of a hydrogenation catalyst comprising essentially a metal selected from the group consisting of nickel, cobalt and copper activated with chromium oxide.

7. The process of producing alcohols by catalytic hydrogenation of materials containing a substantial amount of a salt of from a di- to a trivalent metal, of a fatty acid containing at least 8 carbon atoms in the molecule which consists in treating the said materials at a temperature above 150° C. under a pressure above 10 atmospheres with a gas essentially comprising hydrogen in the presence of a hydrogenation catalyst comprising essentially a metal selected from the group consisting of nickel, cobalt and copper.

8. The process of producing alcohols by catalytic hydrogenation of materials containing a substantial amount of a salt of from a di- to a trivalent metal, of a non-aromatic carboxylic acid obtained by the catalytic oxidation of high molecular non-aromatic hydrocarbons which consists in treating the said materials at a temperature above 150° C. under a pressure above 10 atmospheres with a gas essentially comprising hydrogen in the presence of a hydrogenation catalyst comprising essentially a metal selected from the group consisting of nickel, cobalt and copper.

9. The process of producing alcohols by catalytic hydrogenation of materials containing a substantial amount of non-aromatic carboxylic acids containing at least 8 carbon atoms in the molecule, which consists in saponifying the said materials with a basic reacting substance derived from a di- to a trivalent metal and treating the saponified product at a temperature above 150° C. under a pressure above 10 atmospheres with a gas essentially comprising hydrogen in the presence of a hydrogenation catalyst comprising essentially a metal selected from the group consisting of nickel, cobalt and copper.

10. The process of producing alcohols by catalytic hydrogenation of materials containing non-aromatic carboxylic acids containing at least 8 carbon atoms in the molecule, which comprises saponifying the oxidation products of high-molecular non-aromatic hydrocarbons with a basic reacting substance derived from a di- to a trivalent metal and treating the saponified product at a temperature between 200° and 300° C. and under a pressure from about 100 to 200 atmospheres with a gas essentially comprising hydrogen in the presence of a hydrogenation catalyst comprising essentially a metal selected from the group consisting of nickel, cobalt and copper.

GEORG SCHILLER.